(12) United States Patent
Nielsen et al.

(10) Patent No.: US 9,303,129 B2
(45) Date of Patent: Apr. 5, 2016

(54) HYDROPHILIC GELS DERIVED FROM GRAFTED PHOTOINITIATORS

(75) Inventors: Christian B. Nielsen, Copenhagen (DK); Niels Joergen Madsen, Alleroed (DK); Carsten Hoej, Vanloese (DK)

(73) Assignee: Coloplast A/S, Humlebaek (DK)

( * ) Notice: Subject to any disclaimer, the term of this patent is extended or adjusted under 35 U.S.C. 154(b) by 147 days.

(21) Appl. No.: 13/805,087

(22) PCT Filed: Jun. 22, 2011

(86) PCT No.: PCT/DK2011/050228
§ 371 (c)(1),
(2), (4) Date: Dec. 18, 2012

(87) PCT Pub. No.: WO2011/160640
PCT Pub. Date: Dec. 29, 2011

(65) Prior Publication Data
US 2013/0096221 A1    Apr. 18, 2013

(30) Foreign Application Priority Data

Jun. 22, 2010  (DK) ................................. 2010 70282
Jun. 9, 2011   (DK) ................................. 2011 70287

(51) Int. Cl.
| C08J 3/28 | (2006.01) |
| C08F 2/50 | (2006.01) |
| C08G 65/22 | (2006.01) |
| C08J 3/075 | (2006.01) |
| C08L 71/02 | (2006.01) |

(52) U.S. Cl.
CPC ... *C08J 3/28* (2013.01); *C08F 2/50* (2013.01); *C08G 65/22* (2013.01); *C08J 3/075* (2013.01); *C08L 71/02* (2013.01); *C08J 2371/02* (2013.01); *C08J 2400/10* (2013.01); *C08L 2312/06* (2013.01)

(58) Field of Classification Search
CPC .......... C08G 65/22; C08J 3/28; C08J 3/075; C08J 3/09; C08J 2400/10; C08L 75/16; C08L 71/02; C08L 2312/06; C08F 2/50
See application file for complete search history.

(56) References Cited

U.S. PATENT DOCUMENTS

| 4,477,326 | A | 10/1984 | Lin | |
| 5,073,611 | A * | 12/1991 | Rehmer et al. | 526/208 |
| 6,548,121 | B1 | 4/2003 | Bauer et al. | |
| 2003/0236425 | A1* | 12/2003 | Herr et al. | 556/443 |
| 2009/0098359 | A1 | 4/2009 | Waller, Jr. et al. | |

FOREIGN PATENT DOCUMENTS

| CN | 1662559 | 12/2003 |
| CN | 1844087 | 10/2006 |
| EP | 2 060 589 | 5/2009 |
| WO | WO 99/16812 | 4/1999 |
| WO | 2008071796 | 6/2008 |
| WO | 2009048933 | 4/2009 |

OTHER PUBLICATIONS

Flory, Principles of Polymer Chemistry; Cornell University Press: Ithaca, NY, 1953; Chapter IX.
Almdal, "Towards a Phenomenological Definition of the term 'Gel'", Polymer Gels and Networks, 1 (1993), pp. 5-17.
Gilbert et al. "Essentials of Molecuar Photochemistry", Angew. Chem., 103 (1991) Nr. 11, p. 1554-1555.
Gould et al. "Novel Self-Initiating UV-Curable Resins: Generation Three," Proceedings from RadTech Europe 05, vol. 1, Oct. 18-20, 2005, p. 245-251.
Nguyen et al. "Malemide Reactive Oligomers" Proceedings from RadTech Europe 03, vol. 1, Nov. 3-5, 2003, pp. 589-594.
Fouassier "Excited-State Reactivity in Radical Polymerisation Photoinitiators" in Radiation Curing in Polymer Science and Technology. Ch. 1, pp. 1-61, 1993.
Kopeinig et al. "Further Covalently Bonded Photoinitiators" Proceedings from RadTech Europe 05, vol. 2, Oct. 18-20, 2005, pp. 375-381.
Oliphant et al. "Melt grafting of a basic monomer on to polyethylene in a twin-screw extruder: reaction kinetics." Polymer, v. 36, n. 8, 1995, pp. 1597-1603.
Krivoguz et al. "Structures and Properties of Polypropylene/Low Density Polyethylen Blends Grafted with Itaconic Acid in the Course of Reactive Extrusion." Journal of Applied Polymer Science, v. 102, 2006, pp. 1746-1754.
Sun et al. "Melt free-radical grafting of glycidyl methacrylate onto polypropylene." Angew. Makrom. Chem. 3982 (1995), 1-13.
"Finer features for functional microdevices," Nature, v. 412, Aug. 16, 2001, pp. 697-698.
Mezger. "The Rheology Handbook," Vincentz Network, Hannover, 2006, pgs.
Office Action mailed on Jul. 2, 2014 in U.S. Appl. No. 13/805,067 No copy of the Office Action is provided since this reference is stored on the Office IFW.
Misra et al. (Grafting: a versatile means to modify polymers, techniques, factors and applications, Prog. Polym. Sci. 2004, pp. 767-814).
Tzoganakis: Reactive extrusion of Polymers: A review, Advances in Polymer Technology, vol. 9, 1989, pp. 321-330.

* cited by examiner

*Primary Examiner* — Sanza McClendon
(74) *Attorney, Agent, or Firm* — Coloplast Corp., Coloplast A/S; Nick Baumann

(57) ABSTRACT

The invention provides a method for the manufacture of a gel, said method comprising the steps of: providing a matrix composition comprising a polymeric photoinitiator of the general formula (I): Polymer-[CR$_2$—CHR-Spacer(PI)$_n$]$_m$ (I) curing the matrix composition by exposing it to UV radiation and exposing the matrix composition to a swelling medium. The invention also relates to gels obtainable via the above method. The invention provides a hydrophilic gel precursor manufactured from the polymeric photoinitiator of Formula (I). Medical devices comprising the gels and hydrophilic gel precursors of the invention are provided. The invention also provides the use of a polymeric photoinitiator in the manufacture of a gel.

22 Claims, 2 Drawing Sheets

HYDROPHILIC GELS DERIVED FROM GRAFTED PHOTOINITIATORS

This is a national stage of PCT/DK11/050228 filed Jun. 22, 2011 and published in English, which has a priority of Denmark no. PA 2010 70282 filed Jun. 22, 2010, and Denmark no. PA 2011 70287 filed Jun. 9, 2011, hereby incorporated by reference.

FIELD OF THE INVENTION

The present invention relates to methods for the manufacture of a hydrophilic gel precursor and a gel. The invention also relates to gels and hydrophilic gel precursors obtainable using the above method, as well as medical devices comprising the gels and hydrophilic gel precursors. The invention also provides the use of a polymeric photoinitiator in the manufacture of a gel.

BACKGROUND OF THE INVENTION

Curing of coatings through ultraviolet (UV) radiation, thereby resulting in a coating for use as a gel (e.g. a hydrogel), requires efficient methods of initiating the chemical reaction responsible for the curing process. Cross-linking of polymeric material through generation of radical species upon irradiation with UV light is widely used to produce hydrogels for medical device coatings. Coating compositions with polyvinylpyrrolidone and a photoinitiator as the main constituents, which are cured with UV irradiation, are often used for producing hydrogels. The photoinitiators used in these processes can be either oligomeric or polymeric. Oligomeric photoinitiators are partially free to diffuse to the surface of the cured material, thereby rendering these substances exposed to the environment.

EP 2 060 589 discloses Si—H functional arylketones, in which the arylketone comprises a photoinitiator moiety.

U.S. Pat. No. 4,477,326 relates to polymeric photoinitiators comprising organosilane polymers.

OBJECT OF THE INVENTION

The object of the present invention is to provide a method for the manufacture of hydrophilic gel precursors and gels, as well as the hydrophilic gel precursors and gels which result from these methods.

SUMMARY OF THE INVENTION

In a broad aspect, the present invention relates to a method for the manufacture of a hydrophilic gel, said method comprising the steps of:
a. providing a matrix composition comprising a polymeric photoinitiator of the general formula I:

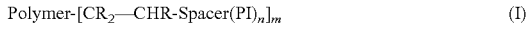  (I)

b. curing the matrix composition obtained in step a. by exposing it to UV radiation, and
c. exposing the matrix composition to a swelling medium.

Steps b. and c. may take place in any order. In the above polymeric photoinitiator of formula (I), m is an integer from 1-5000, n is a real number above 0 and below 5, PI is a photoinitiator moiety, and each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups).

The invention also relates to a method for the manufacture of a gel, said method comprising the steps of:
a. providing a matrix composition comprising a polymeric photoinitiator of the general formula I:

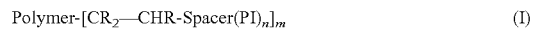  (I)

wherein
m is an integer from 1-5000;
n is a real number above 0 and below 5; and
PI is a photoinitiator moiety;
the polymer is selected from the group consisting of polyacrylates, polyalkylethers, polyurethanes, polyethylene vinyl acetates, polyvinylpyrrolidone and co-polymers and blends thereof;
and wherein each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups),
b. curing the matrix composition obtained in step a. by exposing it to UV radiation
c. exposing the matrix composition to a swelling medium, thus providing a hydrophilic gel wherein step c. may take place before or after step b.

The invention also provides a method for the manufacture of a gel, said method comprising the steps of:
a. providing a matrix composition comprising a polymeric photoinitiator of the general formula I:

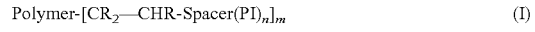  (I)

wherein
m is an integer from 1-5000;
n is a real number above 0 and below 5; and
PI is a photoinitiator moiety;
the polymer is selected from the group consisting of polyacrylates, polyalkylethers, polyurethanes, polyethylene vinyl acetates, polyvinylpyrrolidone and co-polymers and blends thereof;
and wherein each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups),
b. curing the matrix composition obtained in step a. by exposing it to UV radiation
c. exposing the matrix composition to a swelling medium, thus providing a hydrophilic gel wherein step c. may take place before or after step b.

A number of photoinitiators falling within the general scope of formula (I) above may be used in the method of the invention, such as those of the general formulas II, IIa, IIb, III, IV and V:

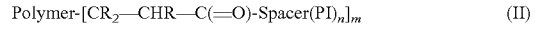  (II)

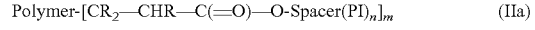  (IIa)

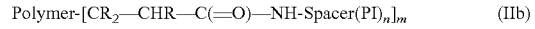  (IIb)

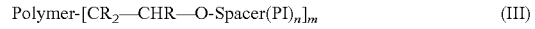  (III)

  (IV)

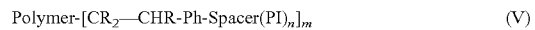  (V)

In the above formulae: m is an integer from 1-5000; n is a real number above 0 and below 5; Ph is an optionally substituted phenyl group, each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups); $R^1$ is a substituent independently selected from hydrogen, C1-C25 linear alkyl, C3-C25 branched alkyl, C3-C25 cycloalkyl, aryl, heteroaryl, —OH, —CN and halogens, and PI is a photoinitiator moiety.

The matrix composition may additionally comprise one or more hydrophilic gel-forming polymers and/or hydrophilic gel-forming monomers. The matrix composition may alternatively consist of the polymeric photoinitiator of the general formula I.

In the case where the swelling medium is water, a hydrogel is obtained.

The invention provides, in another embodiment, a method for manufacturing a hydrophilic gel-precursor, said method comprising the steps of
a. providing a matrix composition consisting of a polymeric photoinitiator of the general formula I:

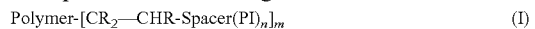

Polymer-[$CR_2$—CHR-Spacer(PI)$_n$]$_m$     (I)

wherein
m is an integer from 1-5000;
n is a real number above 0 and below 5; and
PI is a photoinitiator moiety;
the polymer is selected from the group consisting of polyacrylates, polyalkylethers, polyurethanes, polyethylene vinyl acetates, polyvinylpyrrolidone and copolymers and blends thereof;
and wherein each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups),
b. curing the matrix composition obtained in step a. by exposing it to UV radiation.

The invention relates to the hydrophilic gel-precursor thus obtained.

The invention also relates to a gel obtainable via the methods of the invention. As the photoinitiator remains bound in the matrix composition after curing, these gels can be distinguished from known gels through analysis of their chemical composition.

A medical device is also provided which comprises the gel or the hydrophilic gel precursor of the invention.

In addition, the invention provides the use of a polymeric photoinitiator, of the general formula I, II, IIa, IIb, III, IV or V, in the manufacture of a gel.

Further details of the invention are provided in the following description and the dependent claims.

LEGENDS TO THE FIGURE

DETAILED DISCLOSURE OF THE INVENTION

Definitions

Figure 1:
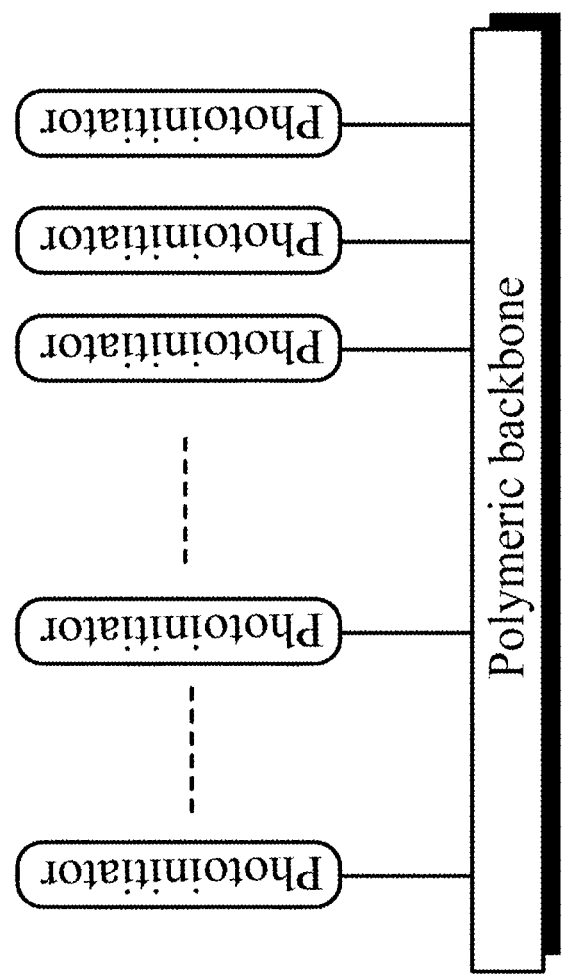
FIG. 1 illustrates a general motif of polymeric photoinitiators, with photoinitiator moieties pendant on a polymeric backbone.

"Optionally-substituted" means optionally-substituted with one or more substituents selected from the group consisting of C1-C25 linear, branched or cyclic alkyl, aryl, —OH, —CN, halogens, amines, amides, alcohols, ethers, thioethers, sulfones and derivatives thereof, sulfonic acid and derivatives thereof, sulfoxides and derivatives thereof, carbonates, isocyanates, nitrates, acrylates. Preferably the one or more substituents are selected from the group consisting of —OH, —CN, halogens, amines, amides, alcohols, ethers, thioethers, sulfones and derivatives thereof, sulfonic acid and derivatives thereof, sulfoxides and derivatives thereof, carbonates, isocyanates, nitrates, acrylates. Most preferably, the substituent is selected from the group consisting of —OH, —CN, halogens, amines, amides, alcohols, ethers, thioethers, sulfones and derivatives thereof, sulfonic acid and derivatives thereof, and sulfoxides and derivatives thereof.

Hydrophilic

A material is described as hydrophilic if it has a natural affinity to water. Hydrophilic materials are defined as those which have a contact angle with water of less than 90°, preferably less than 80°, more preferably less than 75° and most preferably less than 50° (see ASTM D7334-08) measured with an advancing contact angle measurement. In short, the method for measuring the advancing contact angle of a water drop on a surface, is done by deposition of the water droplet (~5-20 μL) controlled in size within 0.1 μL using a hypodermic syringe. A goniometer is then adjusted such that the interior angle of each of the two points of contact of the drop can be determined. Two angle measurements (one on each drop edge) of three drops on the specimen is determined and the contact angle for the specimen is the average of these six angle measurements.

A hydrophilic polymer is likely to contain atoms with high electronegative values such as oxygen and nitrogen. Materials which are hydrophilic according to the above definition will also have an affinity for short-chain (e.g. C1-C8) alcohols and glycerol. Specific examples of hydrophilic polymers are polyethylene oxides, polyvinylacetates, polyvinylpyrolidones, amine functional polymers e.g. poly(2-ethyl-2-oxazoline), acrylics, polyethers, polyalkylethersulfonate and polyvinyl alcohols.

Hydrophilic Gels

A gel is an interconnected, rigid network with pores of submicrometer dimensions and polymeric chains whose average length is greater than a micrometer. The term "gel" is discussed in detail in Flory, P. J. Principles of Polymer Chemistry; Cornell University Press: Ithaca, N.Y., 1953; Chapter IX.

A definition of a gel is provided in Polymer Gels and Networks, 1 (1993), 5-17: A gel is a soft, solid or solid-like material of two or more components one of which is a liquid, present in substantial quantity. Solid-like gels are characterized by the absence of an equilibrium modulus, by a storage modulus, $G'(\omega)$, which exhibits a pronounced plateau extending to times at least of the order of seconds, and by a loss modulus, $G''(\omega)$, which is considerably smaller than the storage modulus in the plateau region.

In the interest of characterizing the efficiency of a photoinitiator in cross-linking polymeric matrices, the transition from a liquid to a solid material is of importance. Liquids are characterized by having $G''(\omega) > G'(\omega)$ and correspondingly, solids are characterized by $G''(\omega) < G'(\omega)$. The transition from liquid to solid, often referred to as the gel-point, is defined as when $G''(\omega) = G'(\omega)$. The cure time defined as the time from initiation of a curing process to when $G''(\omega) = G'(\omega)$ or tan δ=1 is a characteristic measure of the efficiency of a photoinitiator in a specific matrix composition.

Specific Embodiments of the Invention

The present invention provides gels, including hydrophilic gels, hydrophilic gel precursors and methods for their manufacture.

Figure 2:
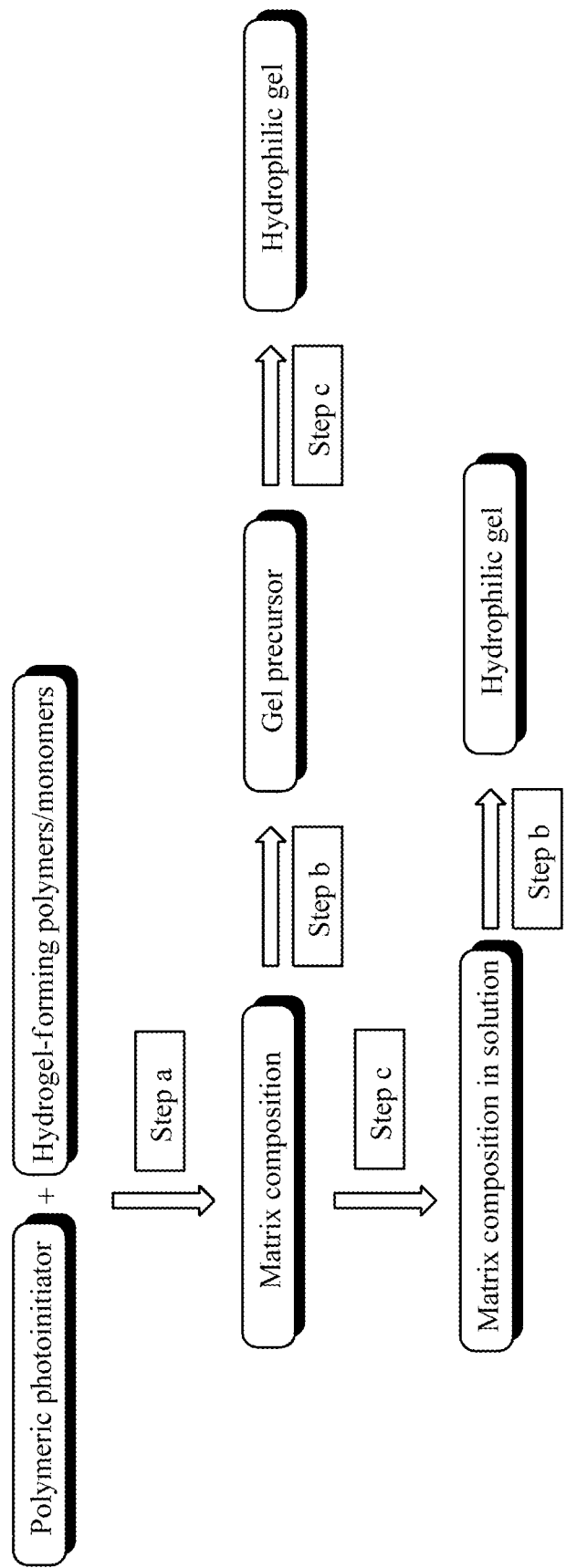
FIG. 2 is a schematic illustration of the method(s) of the invention.

As set out generally in FIG. 2, the invention provides a method for the manufacture of a hydrophilic gel, said method comprising the steps of:
a. providing a matrix composition comprising a polymeric photoinitiator of the general formula I:

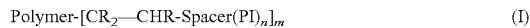

Polymer-[CR$_2$—CHR-Spacer(PI)$_n$]$_m$     (I)

b. curing the matrix composition obtained in step a. by exposing it to UV radiation, and
c. exposing the matrix composition to a swelling medium, thus providing a hydrophilic gel wherein step c. may take place before or after step b.

As the photoinitiators are bound within the matrix composition after curing, the likelihood of photoinitiators of low molecular weight leaching from the surface of the cured material is reduced.

Each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups). Preferably, R is independently selected from hydrogen, C1-C25 linear alkyl, C3-C25 branched alkyl, C3-C25 cycloalkyl, preferably hydrogen.

Suitably, the polymer is thermoplastic. Suitably, the polymer is selected from the group consisting of polyolefines, polyacrylates, polyesters, polyurethanes, polyamides, polyalkyloxides, polydialkylsiloxanes or various copolymers comprising blocks or repeatable units of these polymers. Preferably, the polymer is selected from the group consisting of polyolefines, polyacrylates, polyesters, polyurethanes, polyamides, polyalkyloxides and polydialkylsiloxanes. Most preferably, the polymer is a polyolefin or polyalkyloxide, preferably a polyalkyloxide. The polymer suitably has a molecular weight in the range of 50-500,000 Da.

The spacer is suitably selected from the group consisting of a single bond, C1-C25 linear alkylene, C3-C25 branched alkylene, C3-C25 cycloalkylene, arylene, heteroarylene, amines, amides, alcohols, ethers, esters, thioethers, sulfones and derivatives thereof, sulfonic esters and derivatives thereof, sulfoxides and derivatives thereof and carbonates, ketones and esters. Preferably, the spacer is selected from the group consisting of C1-C25 linear alkylene, C3-C25 branched alkylene, C3-C25 cycloalkylene, and esters.

The spacer may be a polymeric entity. The spacer may be selected from the group consisting of polyolefines, polyacrylates, polyurethanes, polyesters, polyamides, polydialkylsiloxanes, polyalkyloxides or various copolymers comprising blocks or repeatable units of the mentioned polymers. If polymeric, the spacer may have a molecular weight in the range of 50-500,000 Da.

In Formula (I), PI is a photoinitiator moiety.

In the polymeric photoinitiator of Formula (I), m is an integer from 1-5000, preferably from 1-3000, more preferably from 1-1000. n is a real number above 0 and below 5.

The index n refers to a statistical average, and m is the total number of photoinitiator containing moieties attached to the polymeric backbone. Thus a total of (n×m) photoinitiator moieties are present in the polymeric photoinitiator. An example of the nomenclature is given in Scheme 1.

Scheme 1: An example of a polymeric type photoinitiator, illustrating the statistical meaning of the indices. The sum-formula thus reads $C_{20}H_{40}$-$(CH_2$-$CH_2$-$CO(PhCOPh))_2$

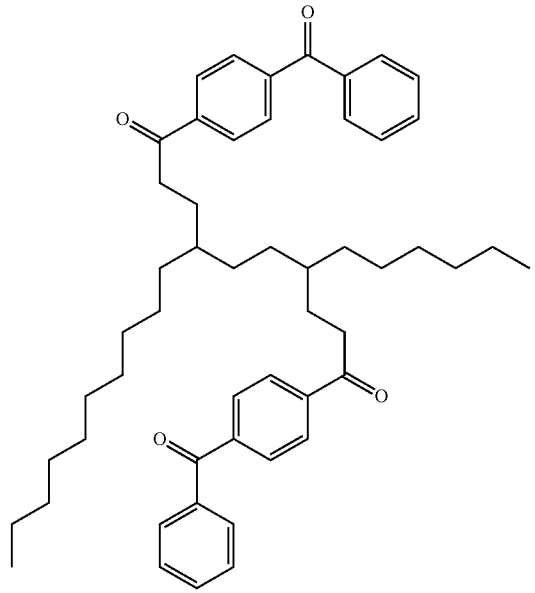

In the present invention, $M_w$ (the weight averaged molecular weight) is used to characterize the polymeric photoinitiators. Efficiency of the polymeric photoinitiator is—among other things—related to how well the photoinitiator is blended with the gel-forming polymer(s) or monomer(s). Amongst important parameters in this respect is the molecular weight of the photoinitiator. A molecular weight which is too high does not allow for good miscibility of the polymeric photoinitiator with other components of the matrix composition. Important for the present invention is the miscibility of the polymeric photoinitiator with the other components in the matrix composition, when considering a two-component system. In particular, if the chemical nature and molecular weight of the polymeric photoinitiator and the gel-forming polymer(s) are markedly different, a poor miscibility is obtained, which in turn results in a matrix composition that is difficult to cure.

Sub-Structures

The invention provides polymeric photoinitiators with sub-structures falling within the scope of Formula (I) above.

The polymeric photoinitiator may have the general formula II:

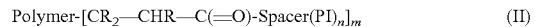

Polymer-[CR$_2$—CHR—C(═O)-Spacer(PI)$_n$]$_m$     (II)

wherein
m is an integer from 1-5000;
n is a real number above 0 and below 5;
each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups);
and PI is a photoinitiator moiety.

Another sub-structure for the polymeric photoinitiator has the general formula IIa:

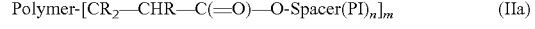

Polymer-[CR$_2$—CHR—C(═O)—O-Spacer(PI)$_n$]$_m$     (IIa)

wherein m is an integer from 1-5000;

n is a real number above 0 and below 5;

each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups);

and PI is a photoinitiator moiety.

A further sub-structure for the polymeric photoinitiator has the general formula IIb:

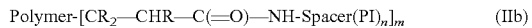

Polymer-[CR$_2$—CHR—C(=O)—NH-Spacer(PI)$_n$]$_m$      (IIb)

wherein m is an integer from 1-5000;

n is a real number above 0 and below 5;

each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups);

and PI is a photoinitiator moiety.

The polymeric photoinitiator may have the general formula III:

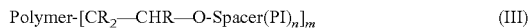

Polymer-[CR$_2$—CHR—O-Spacer(PI)$_n$]$_m$      (III)

wherein m is an integer from 1-5000;

n is a real number above 0 and below 5;

each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups);

and PI is a photoinitiator moiety.

The polymeric photoinitiator may also have the general formula IV:

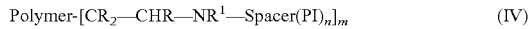

Polymer-[CR$_2$—CHR—NR$^1$—Spacer(PI)$_n$]$_m$      (IV)

wherein m is an integer from 1-5000;

n is a real number above 0 and below 5;

each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups);

R$^1$ is a substituent independently selected from hydrogen, C1-C25 linear alkyl, C3-C25 branched alkyl, C3-C25 cycloalkyl, aryl, heteroaryl, —OH, —CN and halogens;

and PI is a photoinitiator moiety.

The polymeric photoinitiator may have the general formula V

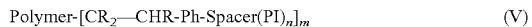

Polymer-[CR$_2$—CHR-Ph-Spacer(PI)$_n$]$_m$      (V)

wherein m is an integer from 1-5000;

n is a real number above 0 and below 5;

Ph is an optionally substituted phenyl group each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups);

and PI is a photoinitiator moiety.

According to sub-structure (V), the Ph group is substituted with one or more substituents independently selected from C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups). Suitably, the phenyl group is unsubstituted.

Of the above sub-structures of the general formulas II, IIa, IIb, III, IV and V, those of formula II (including IIa and IIb) are preferred. This is because the alkene conjugated with a carbonyl group is more reactive in the grafting process. Sub-structures of the general formula IIa are most preferred, as they have the additional benefit of compatibility with acrylate-based matrix compositions, and are relatively simple to synthesise.

Photoinitiator and Photoinitiator Moieties

As set out above, PI is a photoinitiator moiety. In the present invention, a photoinitiator is defined as a moiety which, on absorption of light, generates reactive species (ions or radicals) and initiates one or several chemical reactions or transformation. One preferred property of the photoinitiator is good overlap between the UV light source spectrum and the photoinitiator absorption spectrum. Another desired property is a minor or no overlap between the photoinitiator absorption spectrum and the intrinsic combined absorption spectrum of the other components in the matrix composition.

Suitably, the photoinitiator moieties are pendant on the polymer. This means that they are attached to the polymer at points other than at the polymer ends. Such an arrangement is readily achieved by the method used to synthesise the photoinitiators of Formula I. If m is greater than 1, the —[CR$_2$—CHR-Spacer(PI)$_n$]$_m$ units are preferably spaced evenly along the polymer.

The photoinitiator moieties of the invention may independently be cleavable (Norrish Type I) or non-cleavable (Norrish Type II). Suitably, the photoinitiator moieties of the invention are all non-cleavable (Norrish Type II). For reference, see e.g. A. Gilbert, J. Baggott: "Essentials of Molecular Photochemistry", Blackwell, London, 1991). Upon excitation, cleavable photoinitiator moieties spontaneously break down into two radicals, at least one of which is reactive enough to abstract a hydrogen atom from most substrates. Benzoin ethers (including benzil dialkyl ketals), phenyl hydroxyalkyl ketones and phenyl aminoalkyl ketones are important examples of cleavable photoinitiator moieties. Non-cleavable photoinitiator moieties do not break down upon excitation, thus providing fewer possibilities for the leaching of small molecules from the matrix composition. The photoinitiator moieties of the invention are efficient in transforming light from the UV or visible light source to reactive radicals which can abstract hydrogen atoms and other labile atoms from polymers and hence effect covalent cross-linking. Optionally, amines, thiols and other electron donors can be either covalently linked to the polymeric photoinitiator or added separately or both. The addition of electron donors is not required but may enhance the overall efficiency of cleavable photoinitiators according to a mechanism similar to that described for the non-cleavable photoinitiators below.

Excited non-cleavable photoinitiators do not break down to radicals upon excitation, but abstract a hydrogen atom from an organic molecule or, more efficiently, abstract an electron from an electron donor (such as an amine or a thiol). The electron transfer produces a radical anion on the photoinitiator and a radical cation on the electron donor. This is followed by proton transfer from the radical cation to the radical anion to produce two uncharged radicals; of these the radical on the electron donor is sufficiently reactive to abstract a hydrogen atom from most substrates. Benzophenones and related ketones such as thioxanthones, xanthones, anthraquinones, fluorenones, dibenzosuberones, benzils, and phenyl ketocoumarins are important examples of non-cleavable photoinitiators. Most amines with a C—H bond in α-position to the nitrogen atom and many thiols will work as electron donors. The photoinitiator moieties of the invention are preferably non-cleavable.

Self-initiating photoinitiator moieties are within the scope of the present invention. Upon UV or visible light excitation, such photoinitiators predominantly cleave by a Norrish type I mechanism and cross-link further without any conventional photoinitiator present, allowing thick layers to be cured. Recently, a new class of β-keto ester based photoinitiators has been introduced by M. L Gould, S. Narayan-Sarathy, T. E. Hammond, and R. B. Fechter from Ashland Specialty Chemical, USA (2005): "Novel Self-Initiating UV-Curable Resins: Generation Three", Proceedings from RadTech Europe 05, Barcelona, Spain, Oct. 18-20, 2005, vol. 1, p. 245-251, Vincentz. After base-catalyzed Michael addition of the ester to polyfunctional acrylates, a network is formed with a number of quaternary carbon atoms, each with two neighbouring carbonyl groups.

Another self-initiating system based on maleimides has also been identified by C. K. Nguyen, W. Kuang, and C. A. Brady from Albemarle Corporation and Brady Associates LLC, both USA (2003): "Maleimide Reactive Oligomers", Proceedings from RadTech Europe 03, Berlin, Germany, Nov. 3-5, 2003, vol. 1, p. 589-94, Vincentz. Maleimides initiate radical polymerization mainly by acting as non-cleavable photoinitiators and at the same time spontaneously polymerize by radical addition across the maleimide double bond. In addition, the strong UV absorption of the maleimide disappears in the polymer, i.e. maleimide is a photobleaching photoinitiator; this could make it possible to cure thick layers.

So, in an embodiment of the invention, the photoinitiator moieties include at least two different types of photoinitiator moieties. Preferably, the absorbance peaks of the different photoinitiators are at different wavelengths, so the total amount of light absorbed by the system increases. The different photoinitiators may be all cleavable, all non-cleavable, or a mixture of cleavable and non-cleavable. A blend of several photoinitiator moieties may exhibit synergistic properties, as is e.g. described by J. P. Fouassier: "Excited-State Reactivity in Radical Polymerization Photoinitiators", Ch. 1, pp. 1-61, in "Radiation curing in Polymer Science and technology", Vol. II ("Photo-initiating Systems"), ed. by J. P. Fouassier and J. F. Rabek, Elsevier, London, 1993. Briefly, efficient energy transfer or electron transfer takes place from one photoinitiator moiety to the other in the pairs [4,4'-bis(dimethyl-amino) benzophenone+benzophenone], [benzophenone+2,4,6-trimethylbenzophenone], [thioxanthone+methylthiophenyl morpholinoalkyl ketone].

Furthermore, it has recently been found that covalently linked 2-hydroxy-1-(4-(2-hydroxyethoxy)phenyl)-2-methyl-propan-1-one, which is commercially available with the trade name Irgacure 2959, and benzophenone in the molecule 4-(4-benzoylphenoxyethoxy)phenyl 2-hydroxy-2-propyl ketone gives considerably higher initiation efficiency of radical polymerization than a simple mixture of the two separate compounds, see S. Kopeinig and R. Liska from Vienna University of Technology, Austria (2005): "Further Covalently Bonded Photoinitiators", Proceedings from RadTech Europe 05, Barcelona, Spain, Oct. 18-20, 2005, vol. 2, p. 375-81, Vincentz. This shows that different photoinitiator moieties may show significant synergistic effects when they are present in the same oligomer or polymer.

Each and every one of the above-discussed types of photoinitiators and photoinitiator moieties may be utilised as photoinitiator moieties in the polymeric photoinitiators of the present invention.

According to the invention, the photoinitiator moieties are independently selected from the group consisting of benzoin ethers, phenyl hydroxyalkyl ketones, phenyl aminoalkyl ketones, benzophenones, thioxanthones, xanthones, acridones, anthraquinones, fluorenones, dibenzosuberones, benzils, benzil ketals, α-dialkoxy-acetophenones, α-hydroxy-alkyl-phenones, α-amino-alkyl-phenones, acyl-phosphine oxides, phenyl ketocoumarins, silanes, maleimides and derivatives thereof. Suitably, the photoinitiator moieties are optionally-substituted benzophenones or thioxanthones. The benzophenones or thioxanthones may be "optionally substituted" with one or more moieties defined as per R, above.

Polymeric Photoinitiators of the Invention

The polymeric photoinitiators of the invention can be synthesised by grafting the photoinitiator moieties onto a polymer backbone.

The grafting process begins from a polymer having an X—H bond, and photoinitiator moieties (PI) comprising at least one activated alkene functional group. Radical addition of an X—H bond in the polymer takes place across the C═C double bond of the activated alkene functional group(s) present on the photoinitiator moiety. X—H is a single bond present in the polymer which can form a radical, typically C—H or N—H. For this reason, in the grafted product, a hydrogen atom H is always present on the second carbon atom from the polymer, which has the formula —CHR—.

For the sake of simplicity, each photoinitiator moiety PI suitably comprises one activated alkene functional group per PI moiety.

By "activated alkene" is meant an alkene which—by means of its substituents—has an increased reactivity to radical addition reactions as compared to an alkene substituted with a hydrogen atom (H—). Substituents on the alkene may act as electron-withdrawing or electron-donating substituents, thus changing the electron-density distribution of the activated alkene. Electron-withdrawal or donation from the alkene may be via n-bonds (i.e. delocalisation of electrons), or σ-bonds.

Suitably, the activated alkene functional group is selected from the group consisting of acrylate, vinyl ether, vinyl amine, acrylamide and styrene functional groups. Preferably, the activated alkene functional group is selected from the group consisting of acrylate, vinyl ether, vinyl amine and styrene functional groups. Most preferably, the activated alkene is acrylate.

The method of the invention described above allows the production of various polymeric photoinitiators, such as those of the general formula I, II, IIa, IIb, III, IV or V.

In one aspect, the activated alkene is an acrylate functional group. By "acrylate functional group" is meant the functionality C=C—C(=O)—. In other words, the photoinitiator moiety (PI) comprising an ethylene functionality, from which the polymeric photoinitiators of formula (I) are synthesised, comprises the functional group: CR$_2$=CR—C(=O)—. The products of the grafting reaction of these photoinitiator moieties with polymers have the general formula II:

Polymer-[CR$_2$—CHR—C(=O)-Spacer(PI)$_n$]$_m$ (II)

During the grafting, the acrylate functional group is converted into the CR$_2$—CHR moiety in Formula (II).

Suitably, the acrylate functional group is an acrylate ester, in which case the —[CR$_2$—CHR—C(=O)-Spacer(PI)$_n$]$_m$ units in Formula II comprise a CR$_2$—CHR—C(=O)—O— moiety (i.e. the spacer group comprises an oxygen atom O immediately adjacent the carbonyl (C=O) moiety). Such a sub-class of photoinitiators has the general formula IIa:

Polymer-[CR$_2$—CHR—C(=O)—O-Spacer(PI)$_n$]$_m$ (IIa)

This formula is exemplified in Scheme 2.

Scheme 2: Grafting of 4-benzoylphenyl acrylate onto a polyethylene oxide.

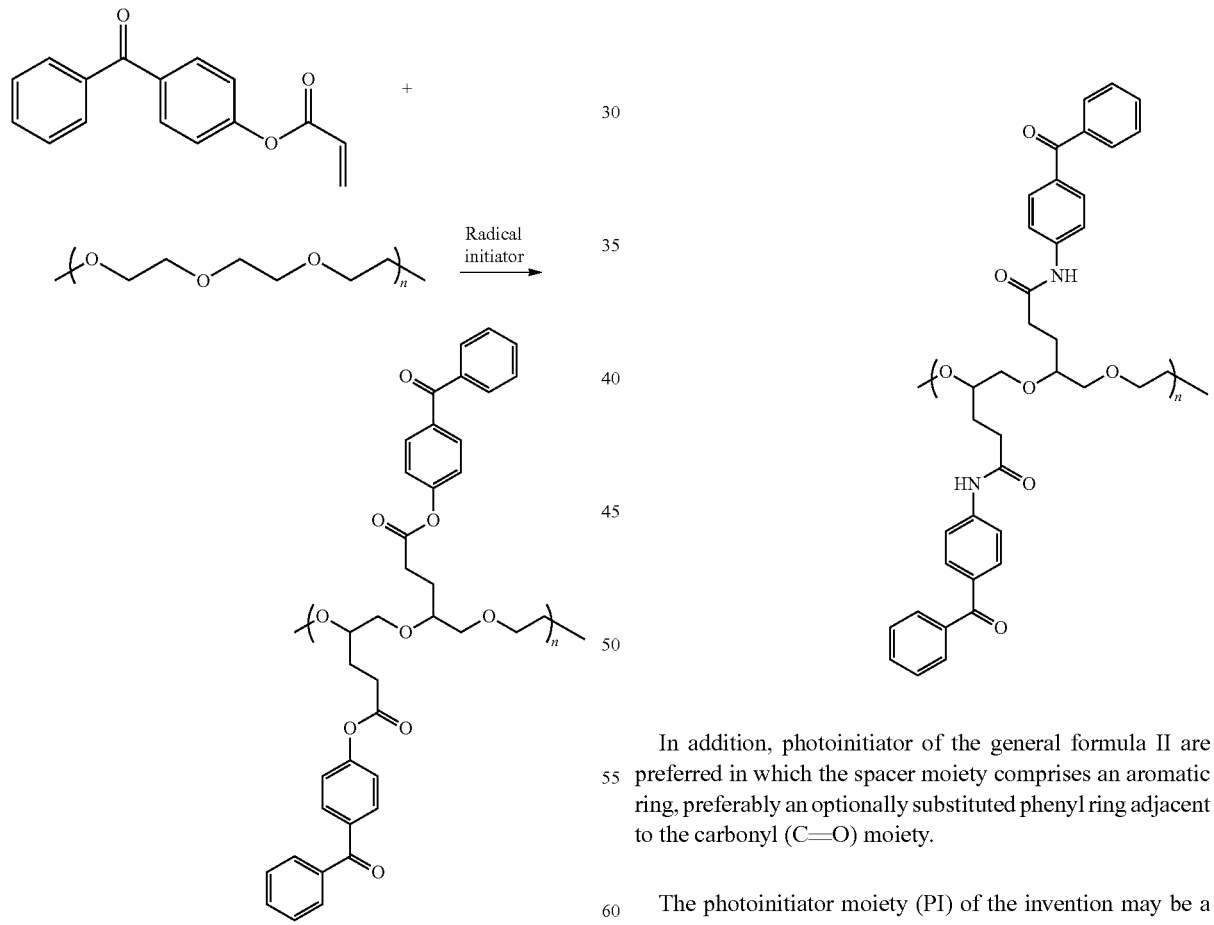

Additionally, the acrylate functional group may be an acrylamide, in which case the —[CR$_2$—CHR—C(=O)-Spacer (PI)$_n$]$_m$ units in Formula II comprise a CR$_2$—CHR—C(=O)—NH— moiety (i.e. the spacer group comprises a nitrogen atom N immediately adjacent the carbonyl (C=O) moiety). Such a sub-class of photoinitiators has the general formula IIa:

Polymer-[CR$_2$—CHR—C(=O)—NH-Spacer(PI)$_n$]$_m$ (IIb)

This formula is exemplified in Scheme 3.

Scheme 3: Grafting of N-(4-benzoylphenyl)acrylamide onto a polyethylene oxide.

In addition, photoinitiator of the general formula II are preferred in which the spacer moiety comprises an aromatic ring, preferably an optionally substituted phenyl ring adjacent to the carbonyl (C=O) moiety.

The photoinitiator moiety (PI) of the invention may be a mono-, di- or tri-acrylate (i.e. comprising one, two or three C=C—C(=O)— moieties, respectively). Preferably, the photoinitiator moiety (PI) monomer is a mono-acrylate.

In another aspect, the activated alkene functional group is a vinyl ether functional group. By "vinyl ether functional group" is meant the functionality $CR_2=CR-O-$. This provides photoinitiators of the general formula III:

$$\text{Polymer-}[CR_2-CHR-O\text{-Spacer}(PI)_n]_m \qquad (III)$$

This formula is exemplified in Scheme 4.

Scheme 4: Grafting of phenyl(4-(vinyloxy)phenyl)methanone onto a polyethylene oxide.

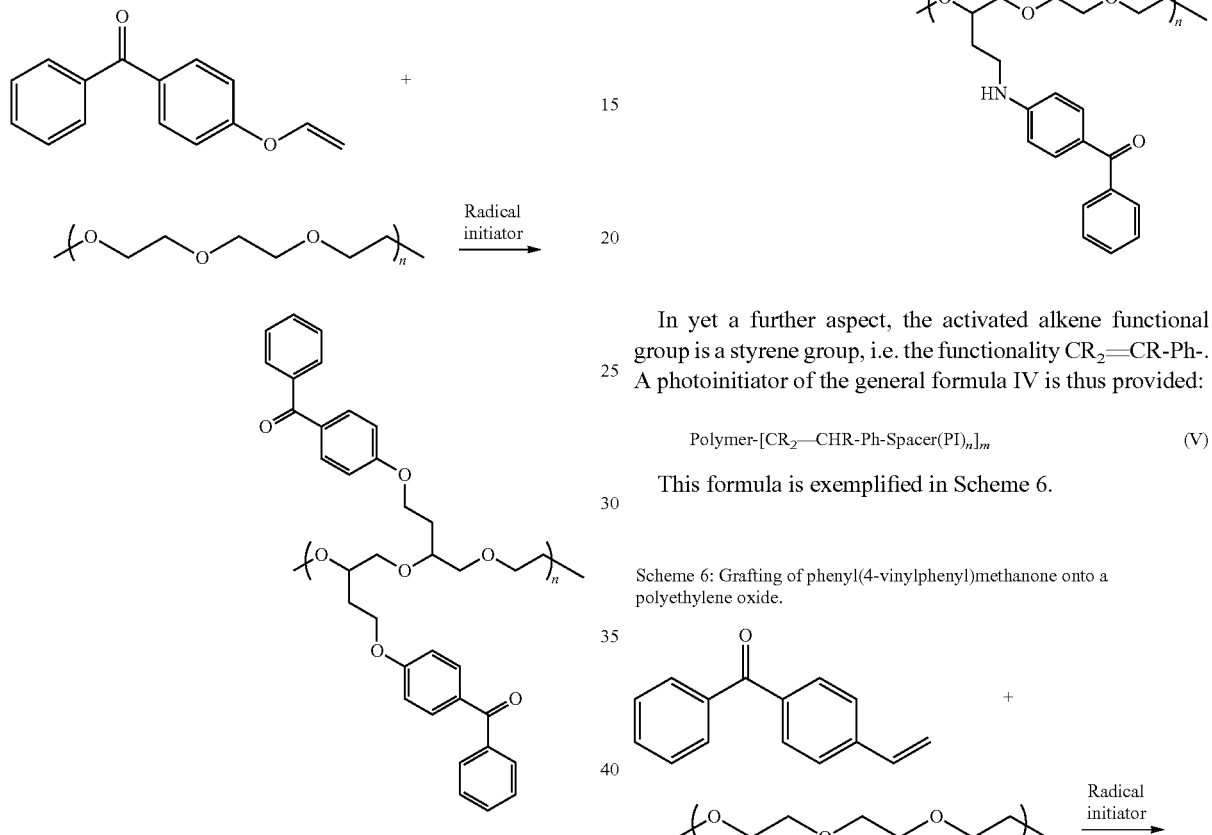

In a further aspect, the activated alkene functional group is a vinyl amide functional group, i.e. the functionality $CR_2=CR-NR^1-$. This provides photoinitiators of the general formula IV:

$$\text{Polymer-}[CR_2-CHR-NR^1\text{-Spacer}(PI)_n]_m \qquad (IV)$$

This formula is exemplified in Scheme 5.

Scheme 5: Grafting of phenyl(4-(vinylamino)phenyl)methanone onto a polyethylene oxide.

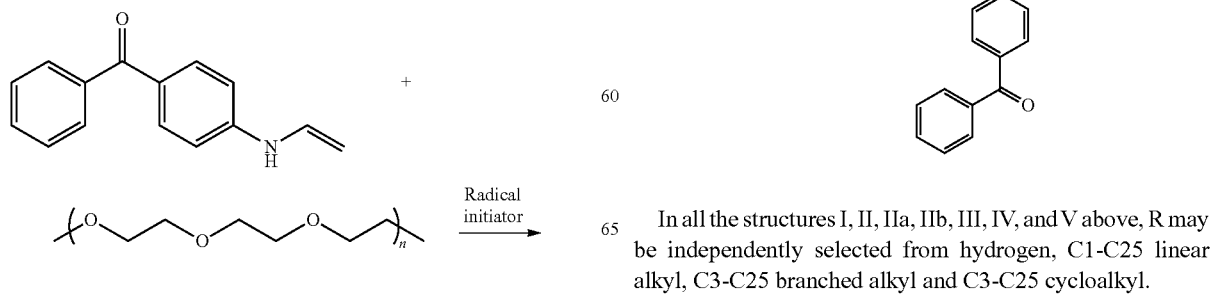

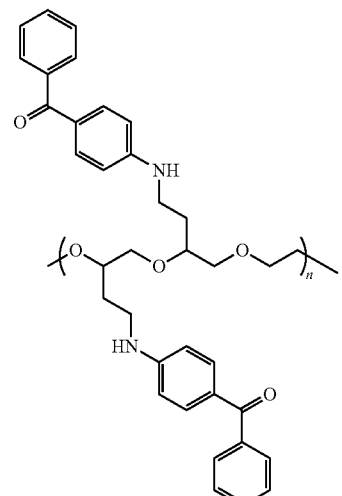

In yet a further aspect, the activated alkene functional group is a styrene group, i.e. the functionality $CR_2=CR\text{-Ph-}$. A photoinitiator of the general formula IV is thus provided:

$$\text{Polymer-}[CR_2-CHR\text{-Ph-Spacer}(PI)_n]_m \qquad (V)$$

This formula is exemplified in Scheme 6.

Scheme 6: Grafting of phenyl(4-vinylphenyl)methanone onto a polyethylene oxide.

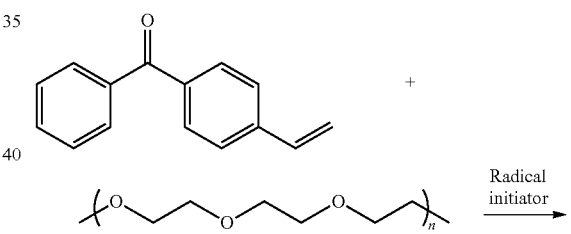

In all the structures I, II, IIa, IIb, III, IV, and V above, R may be independently selected from hydrogen, C1-C25 linear alkyl, C3-C25 branched alkyl and C3-C25 cycloalkyl.

Preferably, in all structures I, II, IIa, IIb, III, IV, and V, all R groups are hydrogen. In that R groups are "independently selected", they may be the same or different in all instances, and are preferably the same.

The polymeric photoinitiators can be synthesized using an extruder as a reactor in a process known as reactive compounding; a technique well known in processes where vinylsilanes are grafted onto polyolefins. The photoinitiator moieties have an activated alkene functional group, which can react with radicals generated on the polymeric backbone through reaction with a radical initiator. Therefore, the grafting of the photoinitiator moieties (PI) onto the polymer may be promoted by a radical initiator.

This is exemplified in Scheme 7, where benzoyl peroxide is used as a radical initiator. All processes occur in the extruder.

describes how itaconic acid is grafted onto polypropylene and polyethylene also using a peroxide as radical initiator in a compounding step.

Grafting photoinitiators onto polymeric materials using activated alkenes as a starting material provides the following benefits: (a) Photoinitiators substituted with activated alkenes (e.g. acrylates) are readily available such as 1-(4-benzoylphenyl)prop-2-en-1-one (obtained from Chemos GmbH). (b) Residual activated alkenes in the form of starting material or pure polymers obtained from reaction of the activated alkene with itself, are typically more soluble than for example a polyolefin grafted photoinitiator. This eases purification of the grafted photoinitiator.

Scheme 7: Grafting of 3-acryloyl-9H-thioxanthen-9-one onto polyethylene using benzoyl peroxide as the radical initiator.

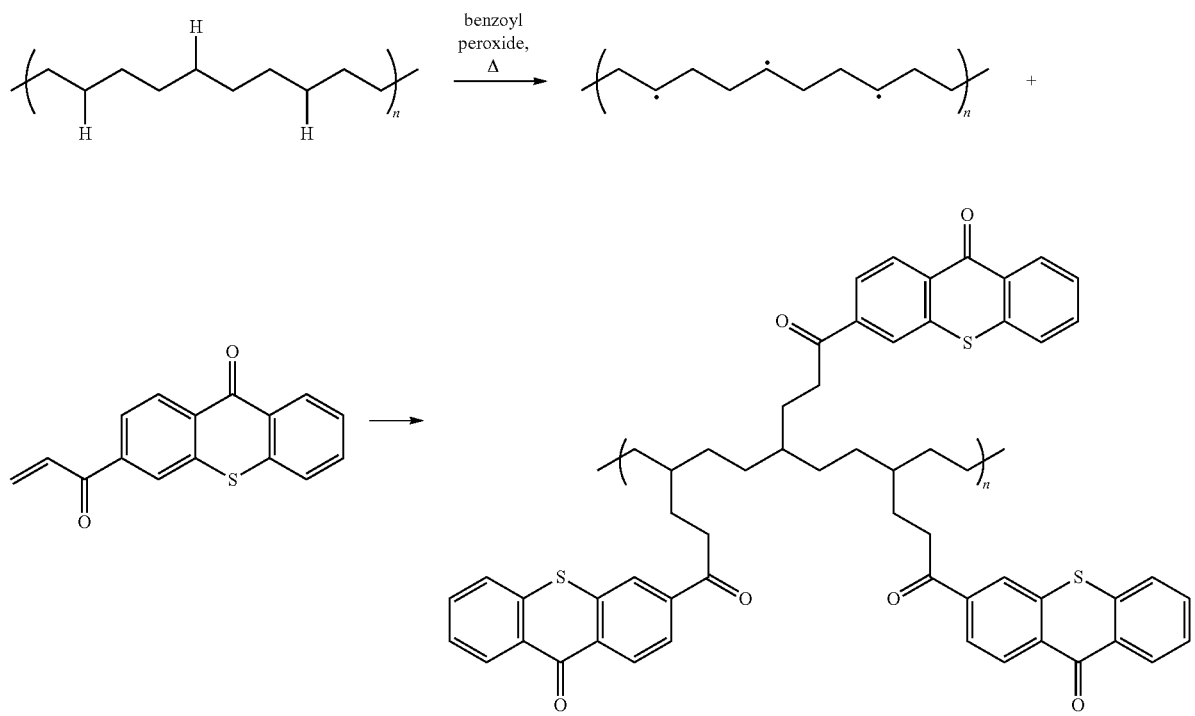

Instead of using a radical initiator, it can be envisaged that the shear forces present during extrusion are sufficient to cause chain scission leaving free radicals which can react with the activated alkene-containing photoinitiator moieties. The skilled person will be able to tune the screw design of the extruder and to optimise process parameters for the extrusion process as required. Therefore, a method according to the invention is provided wherein the grafting of the photoinitiator moieties (PI) onto the polymer takes place in an extruder.

Several reports detail the grafting of acrylates onto polyethylenes using reactive extrusion/compounding, where for example grafting of 2-(dimethylamino)ethyl methacrylate is described in K. E. Oliphant, K. E. Russel, W. E. Baker *Polymer*, 36 (1995), 1597-1603. The radical initiator 1,1-di-(tert-butylperoxy)-3,3,5-trimethylcyclohexane was used in the process.

Similarly, Y. M. Krivoguz, S. S. Pesetskii, B. Jurkowski, T. Tomczyk *J. Appl. Polym. Sci.*, 102 (2006), 1746-1754

An example within the present invention is shown in Scheme 8, where 1-(4-benzoylphenyl)prop-2-en-1-one is grafted onto polyethylene.

Scheme 8: Processing of 1-(4-benzoylphenyl)prop-2-en-1-one and polyethylene to form a polymeric photoinitiator.

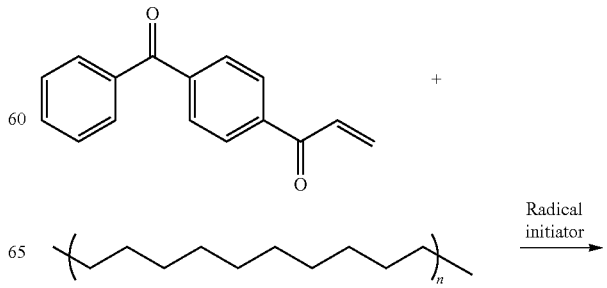

-continued

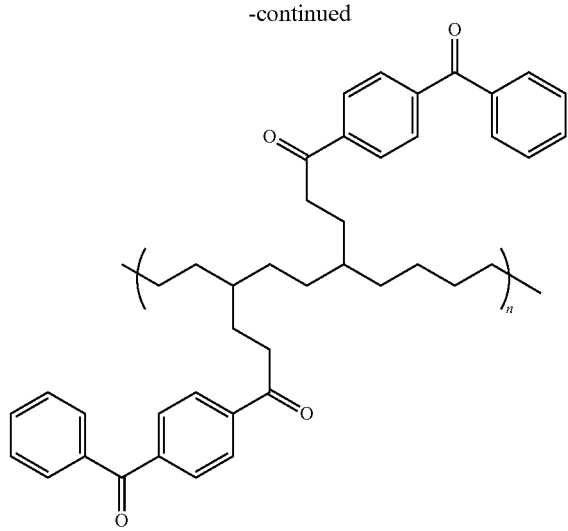

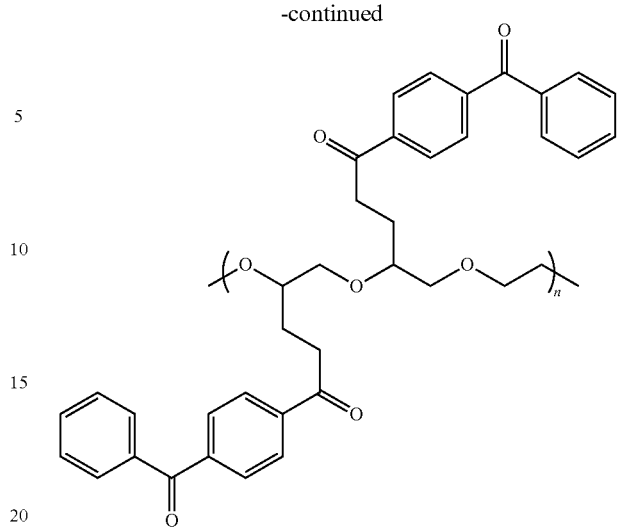

The radical initiator could for example be 2,5-dimethyl-2,5-di-(tert-butylperoxy)hexane (trade name L-101 manufactured by Elf-Atokem France). Other suitable initiators could be dicumyl peroxide (trade name DCP manufactured by AO Kazanorgsintez), 2,2-di-(tert-butylperoxy)-5,5,6-trimethylbiscyclo-[2,2,1]-heptane (trade name D-1 manufactured by Chemico-Technological Center of Belarus, Academy of Sciences), 2,2-di(3-methyl-1-butyne-3-peroxy)-5,5,6-trimethylbiscyclo[2,2,1]heptane (trade name D2 manufactured by Chemico-Technological Center of Belarus, Academy of Sciences) or 2,5-dimethyl-2-hydroxy-5-tert-butylperoxy-3-hexyne (trade name OP-2 manufactured by Chemico-Technological Center of Belarus, Academy of Sciences), benzoyl peroxide, lauroyl peroxide, t-butyl α-cumyl peroxide, di-t-butyl peroxide, di-t-amyl peroxide, t-butyl peroxybenzoate, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, 2,5-bis(t-butylperoxy)-2,5-dimethyl-3-hexyne.

In a previous work (Y.-J. Sun, G.-H. Hu, M. Lambla *Angew. Makrom. Chem.* 3982 (1995), 1-13) it has been described that addition of styrene facilitates an increase in grafting efficiency in particular, when polypropylene is decorated with acrylates, e.g. glycidyl methacrylate.

Of particular importance is the grafting onto polyethylene oxide as exemplified in Scheme 9, where 4-acryloylbenzophenone is grafted onto a PEO chain using a radical initiator.

Scheme 9: Grafting of 4-acryloylbenzophenone onto PEO.

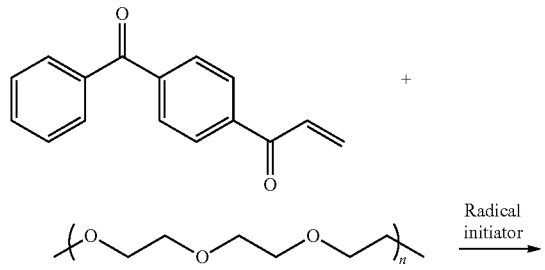

Radical initiator →

The radical initiators suitable for the reaction depicted in Scheme 9 can for example be selected from the initiators listed above.

Matrix Composition

The polymeric photoinitiators of formula (I) are combined with one or more gel-forming polymers and/or gel-forming monomers in the matrix composition. Gel-forming polymers are polymers which—due to their hydrophilic nature—retain a swelling medium such as water within the polymer structure, allowing a hydrophilic gel to be formed, once the matrix composition is cured.

In particular, the gel-forming polymer may be a hydrogel-forming polymer. A hydrogel-forming polymer is selected from the group comprising polyacrylates, polyalkylethers such as polyethylene oxide, polyurethanes, polyamides, polyethylene vinyl acetates, polyvinylpyrrolidone and copolymers and blends thereof. Preferably, the hydrogel-forming polymer is selected from the group consisting of polyalkylethers, polyurethanes, polyethylene vinyl acetate.

A gel-forming monomer is a monomer which produces a gel-forming polymer when polymerised. A hydrogel-forming monomer is one which produces hydrophilic polymers as set out above. Suitable hydrogel-forming monomers may be selected from the group consisting of acrylate monomers, N-vinylpyrrolidone, and epoxide monomers and, for example, monomers with two or more hydroxyl and/or amino functionalities, such as diethanol and aminoethanol.

For providing a gel after a curing step, a polymerization of the monomeric entities occurs in conjecture with cross-linking. After the curing step, the cross-linked composition is then swelled with a swelling medium such as water, C1-C5 alcohols, glycerol and polyethylene glycol (PEG), preferably PEG-2000.

Other possible components in the matrix composition include anti-oxidants such as BHT (2,6-bis(1,1-dimethylethyl)-4-methylphenol), Irganox 1010 (from Ciba) and similar structures. Therapeutic additives are also possible components in the matrix composition. When such additional components are present in the matrix composition, they may be added directly at the same time as the matrix composition is formed, at any point prior to curing, or as a component of the swelling medium. The latter is most preferred.

Curing

The matrix composition of the invention is cured by exposing it to UV radiation.

Curing can either occur in the molten state, or in a solution. The latter comprises steps, where the matrix composition is dissolved in a suitable solvent and for example spray-coated on to a tube, and subsequently exposed to UV radiation. The solvent can afterwards either be evaporated or remain in the coating and function as a swelling medium to provide the desired gel.

The ultraviolet spectrum is divided into A, B and C segments where UV A extends from 400 nm to 315 nm, UV B from 315 to 280 nm, and UV C from 280 to 100 nm. By using a light source that generates light with wavelengths in the visible region (400 to 800 nm) some advantages are obtained with respect to the depth of the curing, provided that the photoinitiator can successfully cure the material at these wavelengths. In particular, scattering phenomena are less pronounced at longer wavelength, thus giving a larger penetration depth in the material. Thus photoinitiators which absorb, and can induce curing, at longer wavelength are of interest. By judicially choosing substituents on the aromatic moieties, the absorption spectrum of the polymeric photoinitiator can to some extent be red-shifted, which would then facilitate curing at comparatively greater depths.

Multi-photon absorption can also be used to cure samples using light sources emitting at wavelengths twice or even multiple times the wavelength of light needed for curing in a one-photon process. For example, a composition containing a photoinitiator with an absorption maximum at ~250 nm could possibly be cured with a light source emitting at ~500 nm utilizing a two-photon absorption process provided that the two-absorption cross section is sufficiently high. A multi-photon initiated cure process could also facilitate greater spatial resolution with respect to the cured area, exemplified in Nature 412 (2001), 697 where a 3D structure is formed by a two-photon curing process.

In the present invention, curing is primarily initiated by exposing the matrix composition to high energy irradiation, preferably UV light. The photoinitiated process takes place by methods described above and which are known per se, through irradiation with light or UV irradiation in the wavelength range from 250 to 500 nm. Irradiation sources which may be used are sunlight or artificial lamps or lasers. Mercury high-pressure, medium pressure or low-pressure lamps and xenon and tungsten lamps, for example, are advantageous. Similarly, excimer, solid stated and diode based lasers are advantageous. Even pulsed laser systems can be considered applicable for the present invention. Diode based light sources in general are advantageous for initiating the chemical reactions.

In the curing process the polymeric photoinitiator transforms the matrix composition, in a chemical process induced by light into a hydrophilic gel precursor.

Auto-Curing

The polymeric photoinitiators described here can both facilitate curing of a surrounding matrix but since the photoinitiators themselves are polymers they can also "auto-cure", meaning that the polymeric photoinitiators can solely constitute the matrix composition that is cured with UV irradiation. This is particularly relevant when the polymer in Formula I is a polyolefin or polyalkyloxide, preferably a polyalkyloxide.

In one aspect, therefore, the invention provides a method for manufacturing a hydrophilic gel precursor, said method comprising the steps of a. providing a matrix composition consisting of a polymeric photoinitiator of the general formula I:

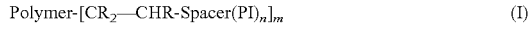

Polymer-[CR$_2$—CHR-Spacer(PI)$_n$]$_m$     (I)

wherein m is an integer from 1-5000;

n is a real number above 0 and below 5; and

PI is a photoinitiator moiety;

the polymer is selected from the group consisting of polyacrylates, polyalkylethers, polyurethanes, polyethylene vinyl acetates, polyvinylpyrrolidone and copolymers and blends thereof and wherein each R group is a substituent independently selected from hydrogen, C1-C25 linear alkyl, C3-C25 branched alkyl, C3-C25 cycloalkyl, aryl, heteroaryl, —OH, —CN, halogens, amines (e.g. —NR'R", where R' and R" are alkyl groups, suitably C1-C25 alkyl groups) and amides (e.g. —CONR'R" or R'CONR"—, where R' and R" are alkyl groups, suitably C1-C25 alkyl groups), b. curing the matrix composition obtained in step a. by exposing it to UV radiation.

The "auto-curing" method suitably takes place with steps a. and b. occurring in alphabetical order, directly after one another (i.e. with no intermediate steps). In one aspect of this "auto-curing" method, the method consists of steps a. and b. alone.

A one-component system—as provided by the "auto-curing" method—provides advantages, in that the polymeric photoinitiators are thermoplastic. As such, they become less viscous under higher shear rate, making them easier to process in an extrusion process. In contrast, for example, poly-vinyl pyrrolidone cannot be extruded. All details and structural refinements of the polymeric photoinitiator provided herein are aimed at providing photoinitiators suitable for use in the "auto-curing" method.

In addition, the polymeric photoinitiators of the "auto-curing" method may comprise the sole component of the matrix composition; i.e. the matrix composition may consist of the polymeric photoinitiators. This provides the advantage that additives (e.g. plasticizers, viscosity modifiers) can be avoided, thereby reducing the chances of low molecular weight components from leaching from the cross-linked matrix composition.

Gel-State

To provide the hydrophilic gel of the invention, the matrix composition is exposed to a swelling medium such as water, C1-C5 alcohols, glycerol and polyethylene glycol (PEG), preferably PEG-2000 (herein referred to as step c.). The compositions are thus swelled to provide a gel. Contact with the swelling medium may take place before or after curing of the matrix composition. The swelling medium may be in its pristine state, or present in combination with other substances, e.g. in a saline solution or a body fluid. Species present in the gaseous state in equilibrium with a significant portion present in their liquid form also constitute a swelling medium.

The matrix composition may be cured by exposure to UV before or after exposure to the swelling medium. If cured first, a "dry", cured matrix composition (=gel precursor) is obtained. If exposed to swelling medium first, a hydrophilic gel can be provided in a one-step process, as the curing step takes place in the presence of the swelling medium. In other words, the swelling medium for the hydrophilic gel is the solvent for the curing step. In terms of method steps, step c. may take place before or after step b. Suitably, step c takes place before step b.

In the "auto-curing" method, the polymeric photoinitiator may be cured by exposure to UV before or after exposure to the swelling medium. If cured first, a "dry", cured polymeric photoinitiator is obtained (=hydrophilic gel precursor). If exposed to swelling medium first, a hydrophilic gel can be provided in a one-step process, as the curing step takes place in the presence of the swelling medium. In other words, the swelling medium for the hydrophilic gel is the solvent for the curing step. Suitably, step c takes place before step b.

A gel is characterized as a swellable material, however, insoluble in the swelling medium. By hydrogel is meant a material comprised mainly of a water soluble or water swellable material. The gel material is characterized in terms of its rheological properties and in its dry state. In particular, the storage and the loss modulus are used to characterize the mechanical properties of the materials (T. G. Mezger: "The Rheology Handbook", Vincentz Network, Hannover, 2006). As described above, curing of a matrix composition is followed by monitoring the change of G'(ω) and G"(ω) as a function of UV exposure time. In the examples used to describe the present invention, a frequency of 1 Hz is used to probe the rheological properties and the samples were heated to 120° C. during testing.

The invention also relates to a hydrophilic gel, obtainable via the methods described herein.

Medical Device

One aspect of the invention provides a medical device comprising the gel precursor or hydrophilic gel resulting from the methods of the invention. The term "medical device" should be interpreted in a fairly broad sense. Suitable examples of medical devices (including instruments) are catheters (such as urinary catheters), endoscopes, laryngoscopes, tubes for feeding, tubes for drainage, endotracheal tubes, guide wires, sutures, cannulas, needles, thermometers, condoms, urisheaths, barrier coatings e.g. for gloves, stents and other implants, contact lenses, extra corporeal blood conduits, membranes e.g. for dialysis, blood filters, devices for circulatory assistance, dressings for wound care, and ostomy bags. Most relevant are catheters, endoscopes, laryngoscopes, tubes for feeding, tubes for drainage, guide wires, sutures, and stents and other implants. Particularly interesting medical devices within the context of the present invention are catheters, such as urinary catheters.

The medical device may be coated on at least a surface portion thereof with the gel precursor or hydrophilic gel of the invention. In some embodiments, the hydrophilic gel covers the full (outer) surface of the medical device, and in some other embodiments, only to a part of the surface thereof. In the most relevant embodiments, the hydrophilic gel covers at least a part of the surface (preferably the whole surface) of the medical device that—upon proper use—comes into direct contact with body parts for which the medical device is intended. It may be that the medical device is coated with a gel precursor, and the hydrophilic gel is generated upon contact with liquid—either the bodily fluids of the patient, or an activating solution containing water.

The invention thus provides a catheter obtainable via the method of the invention, in particular a catheter, wherein the hydrophilic gel is coated on at least a surface portion thereof.

The invention also relates to the use of a photoinitiator, of the general formula I, II, IIa, IIb, III, IV or V, wherein m, n, PI, R, R¹, the Spacer and the polymer are as defined herein, in the manufacture of a hydrophilic gel, in particular a hydrogel.

Example 1

A series of grafted polyethylene oxide polymers is made by charging a Brabender mixer with 60 g of PEO NF1 (Sumitomo) at 150° C. To this mixture is added various amounts of 4-acryloylbenzophenone (1-10 g) and 2,5-bis(tert-butylperoxy)-2,5-dimethylhexane in various amounts (0.5-5 g). This mixture is blended for 20 minutes at 150° C. and subsequently collected from the Brabender mixer. The isolated material is analyzed using FT-IR to ensure complete conversion of the added acrylate.

Exposure of this material to water results in a hydrogel, as a swellable material, however, insoluble in the water. Furthermore, the hydrogel is a solid or solid-like material of two or more components one of which is a liquid, present in substantial quantity. Solid-like gels are characterized by the absence of an equilibrium modulus, by a storage modulus, G'(ω), which exhibits a pronounced plateau extending to times at least of the order of seconds, and by a loss modulus, G"(ω), which is considerably smaller than the storage modulus in the plateau region.

Although the invention has been described with reference to a number of embodiments and preferred features, the fullest scope should not be considered as limited to precisely these embodiments. The scope of the invention is determined by the appended claims. Compatible features from various embodiments and aspects of the invention may be combined at will by the person skilled in the art, while remaining within the framework of the invention.

The invention claimed is:

1. A method for the manufacture of a hydrophilic gel, said method comprising the steps of:
   a) providing a matrix composition comprising a polymeric photoinitiator of the general formula:

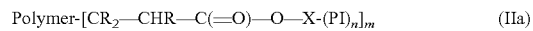

Polymer-[CR$_2$—CHR—C(=O)—O—X-(PI)$_n$]$_m$ (IIa)

wherein m is an integer greater than 1 to 5000;
   n is a real number above 0 and below 5; and
   PI is a photoinitiator moiety;
   X is selected from the group consisting of a single bond, a C1-C25 linear alkylene, a C3-C25 branched alkylene, a C3-C25 cycloalkylene, an arylene, a heteroarylene, an amine, an amide, an alcohol, an ether, an ester, a thioether, a sulfone and derivatives thereof, a sulfonic ester and derivatives thereof, a sulfoxide and derivatives thereof, a carbonate, a ketone and a polymeric moiety,
   and wherein each R group is a substituent independently selected from hydrogen, C1-C25 linear alkyl, C3-C25 branched alkyl, C3-C25 cycloalkyl, aryl, heteroaryl, —OH, —CN, halogens, —NR'R", where R' and R" are alkyl groups or CONR'R" or R'CONR"—, where R' and R" are alkyl groups,
   b) curing the matrix composition obtained in step a) by exposing it to UV radiation,
   c) exposing the matrix composition to a swelling medium, thus providing a hydrophilic gel,
   wherein step c) may take place before or after step b).

2. The method according to claim 1, wherein the matrix composition additionally comprises one or more hydrophilic gel-forming polymers and/or hydrophilic gel-forming monomers.

3. The method according to claim 2, wherein the gel-forming polymer is selected from the group consisting of polyacrylates, polyalkylethers, polyurethanes, polyethylene vinyl acetates, polyvinylpyrrolidone and co-polymers and blends thereof.

4. The method according to claim 2, wherein the gel-forming monomer is selected from the group consisting of acrylate monomers, N-vinylpyrrolidone, and epoxide monomers.

5. The method according to claim 1, wherein the polymer in formula IIa is selected from the group consisting of polyolefins, polyacrylates, polyesters, polyurethanes, polyamides, polyalkyloxides, polydialkylsiloxanes or various copolymers comprising blocks and repeatable units of these polymers.

6. The method according to claim 5, wherein the polymer in formula IIa is selected from the group consisting of polyolefins, polyacrylates, polyesters, polyurethanes, polyamides, polyalkyloxides and polydialkylsiloxanes.

7. The method according to claim 6, wherein the polymer in formula IIa is a polyolefin or polyalkyloxide.

8. The method according to claim 1, wherein the polymer formula IIa has a molecular weight in the range of 50-500,000 Da.

9. The method according to claim 1, wherein X is selected from the group consisting of C1-C25 linear alkylene, C3-C25 branched alkylene, C3-C25 cycloalkylene, and esters.

10. The method according to claim 1, wherein X is selected from the group consisting of polyolefins, polyacrylates, polyurethanes, polyesters, polyamides, polydialkylsiloxanes, polyalkyloxides or various copolymers comprising blocks or repeatable units thereof.

11. The method according to claim 1, wherein X has a molecular weight in the range of 50-500,000 Da.

12. The method according to claim 1, wherein the photoinitiator moiety is independently selected from the group consisting of benzoin ethers, phenyl hydroxyalkyl ketones, phenyl aminoalkyl ketones, benzophenones, thioxanthones, xanthones, acridones, anthraquinones, fluorenones, dibenzosuberones, benzils, benzil ketals, α-dialkoxy-acetophenones, α-hydroxy-alkyl-phenones, α-amino-alkyl-phenones, acylphosphine oxides, phenyl ketocoumarins, silanes, maleimides and derivatives thereof.

13. The method according to claim 12, wherein the photoinitiator moiety is selected from the group consisting of benzophenone, thioxanthone, substituted benzophenone and substituted thioxanthone.

14. The method according to claim 1, wherein m is an integer from 2-3000.

15. The method according to claim 1, wherein the polymeric photoinitiator of Formula IIa is synthesized by grafting photoinitiator moieties (PI) onto the polymer in the presence of a radical initiator.

16. The method according to claim 15, wherein the grafting of the photoinitiator moieties (PI) onto the polymer takes place in an extruder.

17. The method according to claim 1, wherein the photoinitiator units are pendant on the polymer.

18. The method according to claim 1, wherein the matrix composition additionally comprises an anti-oxidant.

19. The method according to claim 1, wherein each R is independently selected from the group consisting of a hydrogen atom, a C1-C25 linear alkyl, a C3-C25 branched alkyl and a C3-C25 cycloalkyl.

20. The method according to claim 1, where the swelling medium is selected from the group consisting of water, C1-C5 alcohols, glycerol and polyethylene glycol (PEG).

21. The method according to claim 20, where the swelling medium comprises water.

22. The method according to claim 1, wherein step c takes place before step b.

* * * * *